United States Patent Office.

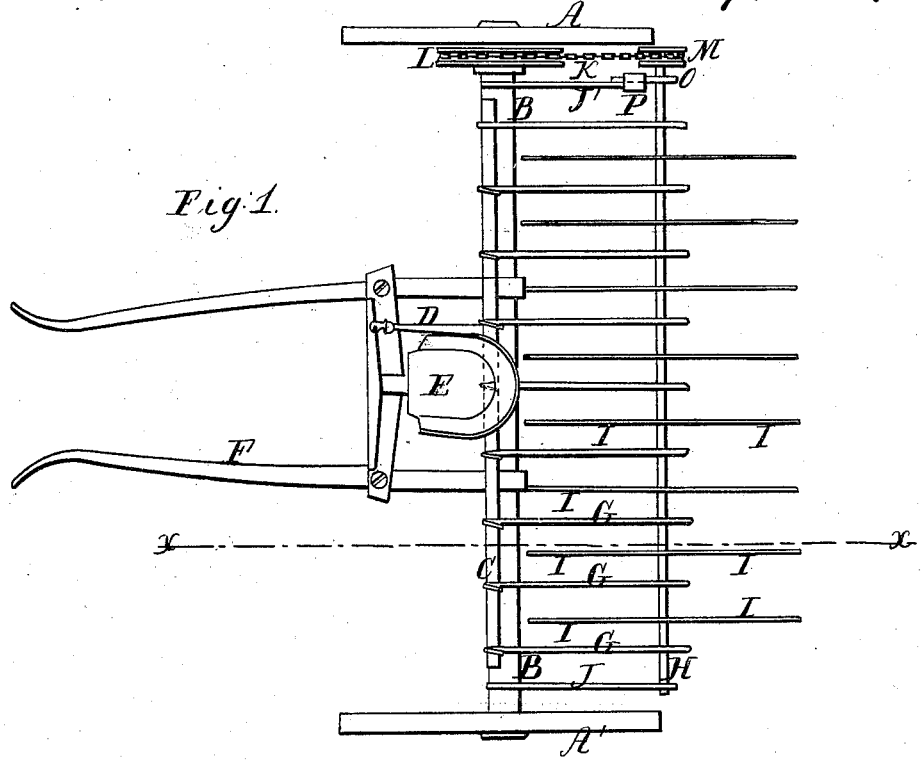
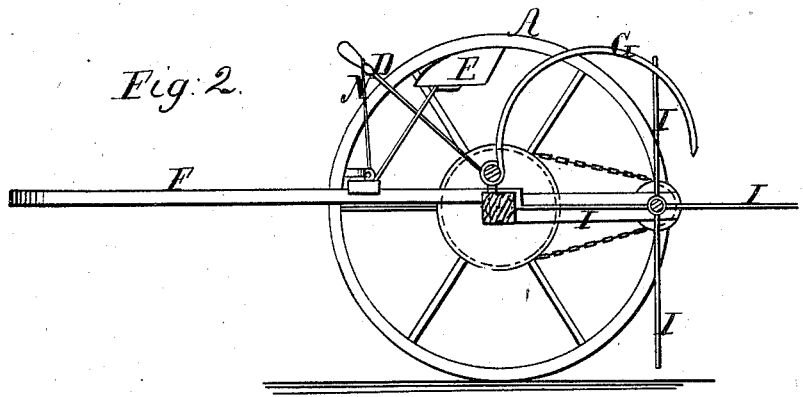

JOHN C. MILLS, OF PALMYRA, NEW YORK.

Letters Patent No. 97,543, dated December 7, 1869.

COMBINED HAY-RAKE AND TEDDER.

The Schedule referred to in these Letters Patent and making part of the same.

*To all whom it may concern:*

Be it known that I, JOHN C. MILLS, of Palmyra, in the county of Wayne, and State of New York, have invented a new and useful Improvement in Combined Hay-Rake and Tedder; and I do hereby declare that the following is a full, clear, and exact description thereof, which will enable others skilled in the art to make and use the same, reference being had to the accompanying drawing, forming part of this specification.

This invention relates to a new and useful improvement in combining two important agricultural machines in one, or combining a tedder with a hay-rake; and It consists in the construction of the tedder, and the arrangement of the same, in combination with the rake, as will be hereinafter more fully described.

In the accompanying sheet of drawing—

Figure 1 represents a top or plan view of the combined machine.

Figure 2 is a vertical section of fig. 1, through the line $x\ x$.

Similar letters of reference indicate corresponding parts.

A A' represent the wheels, and B, the axle of the machine.

C is the bar of the hay-rake which is connected with the axle by eye-bolts, and operates in the same manner as ordinary steel-tooth hay-rakes.

D is the lever, by which the teeth are raised.

E is the driver's seat.

F represents the shafts or thills for the horse.

G represents the teeth or tines of the hay-rake.

Thus far I have described the essential parts of the ordinary spring-tooth horse hay-rake. With this I combine the hay-tedder.

The tedder is formed of a shaft, H, with a series of arms or teeth, I, connected rigidly to the shaft in any suitable manner.

As will be seen, these arms I are revolved, so that their ends just clear the axle B.

J J' are horizontal supporting-arms, which are fixed to the axle B, from which arms the tedder-shaft H is supported.

The tedder is revolved by means of an endless chain or belt, K, from the wheel L, which is fast to the hub of the wheel A, and runs to the pulley M, on the end of the tedder-shaft H, as seen in the drawing.

When the tedder is in use, the teeth of the hay-rake are raised, by means of the lever D, as seen in fig. 2.

N is a rod or hook, for holding the lever D in this position, while the tedder is in use.

The tedder is readily detachable from the hay-rake, (when not required for use,) by means of the slide O, which is connected with the arm J' by means of the clip P, where it may be fastened by a set-screw or otherwise.

It will be seen, that by throwing the chain from the pulley M, and withdrawing the slide O from the clip P, the tedder may be removed, leaving the hay-rake in perfect order for use.

When the rake-tines are raised for tedding, as seen in fig. 2, they serve as guides, to prevent the hay from clogging.

The advantages of this arrangement are, that at a slight expense, the farmer is provided with two indispensable machines, each perfect in itself, as regards its durability and operation.

Having thus described my invention,

I claim as new, and desire to secure by Letters Patent—

A combined hay-rake and tedder, consisting of a rake-bar, C, curved tines G, handle D, and detent-bar N, and the shaft H, having teeth I, supported on the horizontal arms J J', removable by means of slide O and clip P, and operated by wheel L and pulley M, arranged as described.

JOHN C. MILLS.

Witnesses:
  GEO. H. TOWNSEND,
  WILLARD DOOLITTLE.